US008603264B2

United States Patent
Wu et al.

(10) Patent No.: US 8,603,264 B2
(45) Date of Patent: Dec. 10, 2013

(54) WELDABLE, CRACK-RESISTANT CO-BASED ALLOY AND OVERLAY

(75) Inventors: James B. C. Wu, Fenton, MO (US); Volker Hellinger, Koblenz (DE); Matthew X. Yao, Belleville (CA)

(73) Assignee: Kennametal Inc., Latrobe, PA (US)

( * ) Notice: Subject to any disclaimer, the term of this patent is extended or adjusted under 35 U.S.C. 154(b) by 1598 days.

(21) Appl. No.: 11/755,594

(22) Filed: May 30, 2007

(65) Prior Publication Data

US 2008/0193675 A1 Aug. 14, 2008

Related U.S. Application Data

(63) Continuation-in-part of application No. PCT/US2005/043221, filed on Nov. 30, 2005.

(60) Provisional application No. 60/631,638, filed on Nov. 30, 2004.

(51) Int. Cl.
  *C22F 1/10* (2006.01)
  *B05D 3/00* (2006.01)
  *C22C 19/07* (2006.01)

(52) U.S. Cl.
  USPC ......... 148/522; 427/580; 427/398.1; 420/436

(58) Field of Classification Search
  USPC ................ 148/522; 427/580, 398.1; 420/436
  See application file for complete search history.

(56) References Cited

U.S. PATENT DOCUMENTS

| 2,538,882 A | 1/1951 | Schonberg |
| 4,353,742 A * | 10/1982 | Crook ........................... 420/585 |
| 4,465,515 A | 8/1984 | Mundorff |
| 4,556,607 A | 12/1985 | Sastri |
| 4,618,474 A | 10/1986 | Ohe et al. |
| 4,650,725 A * | 3/1987 | Bose et al. ..................... 428/668 |
| 4,689,463 A * | 8/1987 | Shubert ....................... 219/76.16 |
| 4,692,305 A | 9/1987 | Rangaswamy et al. |
| 5,002,731 A | 3/1991 | Crook et al. |
| 5,360,961 A | 11/1994 | Ingall et al. |
| 6,124,564 A | 9/2000 | Sue et al. |
| 6,479,014 B1 | 11/2002 | Wu et al. |
| 6,733,603 B1 | 5/2004 | Wu et al. |
| 6,852,176 B2 | 2/2005 | Wu et al. |
| 2005/0142026 A1 | 6/2005 | Wu et al. |
| 2006/0210826 A1 | 9/2006 | Wu et al. |

FOREIGN PATENT DOCUMENTS

| FR | 1322149 | 3/1963 |
| JP | 4202732 | 7/1992 |

OTHER PUBLICATIONS

ASM International, Materials Park, Ohio, Welding, Brazing, and Soldering: Hardfacing, Weld Cladding, and Dissimilar Metal Joining, vol. 6, pp. 789-829, Dec. 1993.*
International Preliminary Report on Patentability, PCT/US2005/043221, dated Mar. 3, 2009, 7 pages.
International Search Report and the Written Opinion of the International Searching Authority, PCT/US05/43221, dated Dec. 10, 2007, 10 pages.
Abstract of JP4202732; Jul. 23, 1992.
Final Office Action, U.S. Appl. No. 12/669,429, dated Apr. 24, 2013, 9 pages.

* cited by examiner

*Primary Examiner* — Jessee Roe
(74) *Attorney, Agent, or Firm* — Matthew W. Smith, Esq.

(57) ABSTRACT

A method for imparting wear- and corrosion-resistance to a metal component comprising overlaying the component with a ductile Co-based alloy comprising between about 0.12 wt % and about 0.7 wt % C, between about 20 wt % and about 30 wt % Cr, between about 10 wt % and about 15 wt % Mo, between about 1 wt % and about 4 wt % Ni, and balance of Co, without forming cracks during the alloy's solidification.

25 Claims, 5 Drawing Sheets

US 8,603,264 B2

WELDABLE, CRACK-RESISTANT CO-BASED ALLOY AND OVERLAY

CROSS-REFERENCE TO RELATED APPLICATIONS

This application is a continuation-in-part and claims priority from PCT application Ser. No. PCT/US2005/043221 filed on Nov. 30, 2005, which claims priority from U.S. provisional application Ser. No. 60/631,638 filed on Nov. 30, 2004, the entire disclosures of which are incorporated herein by reference.

FIELD OF THE INVENTION

The present invention relates generally to a Co-based alloy. More particularly, the invention relates to a ductile Co-based alloy that provides wear and corrosion resistance and a method for applying such an alloy as an overlay surface treatment on substrates. The invention is especially applicable to application by weld build up on large surfaces where cracking is a risk due to thermal phenomena during cooling.

BACKGROUND OF THE INVENTION

Cobalt-based alloys are used in many wear or abrasion-intensive applications because of their excellent wear resistance and ability to alloy well with many desirable alloying elements. One potential problem with Co-based alloys is their corrosion resistance when exposed to a corrosive medium, such as seawater, brackish water, mineral oil-based hydraulic fluids, acids, and caustics. One way that Co-based alloys have been designed to display improved corrosion resistance is by including Mo and Cr. But the simultaneous presence of C in many Co-based alloys can reduce the efficacy of these alloying elements by forming carbides. Therefore, the C concentration in Co-based alloys traditionally has been decreased to allow the Mo and Cr additions to impart improved corrosion resistance to the alloy. The lowered C concentration, however, has the undesirable effect of lowering the alloy's overall hardness, thereby reducing the alloy's wear resistance.

Further, Co-based alloys are particularly useful in high temperature applications because of Co's high melting point. But forming entire components using Co-based alloys is cost prohibitive. For example, it is cost prohibitive to form a 500 lb. component from a Co-based alloy, whereas forming a Co-based overlay on a Fe-based substrate is much cheaper. Therefore, to still take advantage of Co-based alloys' desirable properties, one common use of Co-based alloys is as a surface treatment, e.g., a coating or overlay, on substrates. Because of the high heat involved in applying Co-based alloys as a surface treatment, preheating the substrate is often required to avoid cracking of the overlay as it cools. Preheating is difficult or commercially impractical when the Co-based alloy is being applied to large substrates. Furthermore, substrates made of heat treated metals may not be heat-treatable at all because such a procedure would cause distortion or degradation of intended substrate properties. Therefore, to successfully treat a substrate surface with a Co-based alloy without preheating, the alloy must have sufficient flow characteristics in molten form and ductility during and after solidification. It must also have thermal characteristics compatible with deposition onto a relatively cooler substrate without preheating.

U.S. Pat. No. 6,479,014 discloses Co—Cr—Mo and Co—Cr—Mo—W alloys for saw tooths. U.S. Pat. No. 5,002, 731 discloses a Co—Cr—Mo—W alloy with C and N for improved corrosion and wear resistance.

SUMMARY OF THE INVENTION

Among the objects of the invention, therefore, is the provision of a Co-based alloy that has sufficient ductility to be applied via a weld overlay operation, while also having improved corrosion and wear resistance.

Briefly, therefore, the invention is directed to a Co-based alloy and method for deposition thereof. The alloy comprises, by approximate wt %, 0.12-0.7% C, 20-30% Cr, 10-15% Mo, and 1-4% Ni.

The invention is also directed to a method for forming a wear- and corrosion-resistant overlay on a metal substrate comprising applying molten material comprising metal constituents of a Co—Cr—Mo alloy comprising between about 0.12 wt % and about 0.7 wt % C, between about 20 wt % and about 30 wt % Cr, between about 10 wt % and about 15 wt % Mo, between about 1 wt % and about 4 wt % Ni, and balance of Co; and solidifying the molten material on the substrate to form said overlay comprising said Co—Cr—Mo alloy.

The invention is also directed to a mixture of metal powder for use in forming a wear- and corrosion-resistant overlay on a metal substrate, the mixture comprising between about 0.12 wt % and about 0.7 wt % C, between about 20 wt % and about 30 wt % Cr, between about 10 wt % and about 15 wt % Mo, between about 1 wt % and about 4 wt % Ni, and balance of Co.

The invention is further directed to a tubular wire for use in forming a wear- and corrosion-resistant overlay on a metal substrate, the wire comprising a cobalt-based sheath and metal powder there, wherein the composite make-up of the sheath and powder comprises between about 0.12 wt % and about 0.7 wt % C, between about 20 wt % and about 30 wt % Cr, between about 10 wt % and about 15 wt % Mo, between about 1 wt % and about 4 wt % Ni, and balance of Co.

Other objects and features of this invention will be in part apparent and in part pointed out hereinafter.

DETAILED DESCRIPTION OF THE PREFERRED EMBODIMENTS

In accordance with this invention, a Co-based alloy is provided that has improved corrosion and wear resistance and can be applied via a surface treatment operation without requiring preheating the substrate. Despite the absence of preheating, the alloy does not fracture, nor do the properties otherwise degrade, during solidification. The Co-based alloy is suitable for weld overlay applications on large scale substrates. In one aspect, therefore, the invention is a Co—Cr—Mo wear- and corrosion-resistant overlay on a metallic component such as a hydraulic cylinder or other large-surface industrial component. The overlay surface area is typically greater than about 1 m$^2$, such as between about 1 m$^2$ and about 10 m$^2$. The thickness of the overlay is at least about 50 microns, such as between about 50 microns and about 10 mm.

In another aspect, the invention is an alloy in the form of a rod, casting, consumable electrode, or wire used to form the overlay of the invention.

The invention involves build-up with Co-based alloys because Co-based alloys display resistance to heat, abrasion, corrosion, galling, oxidation, thermal shock, and wear, which are desirable properties for many applications. Further, Co alloys well with several desirable alloying elements and tends to form a tough matrix.

The invention is, therefore, in one aspect a Co-based alloy for a weld overlay process. This alloy composition, in a preferred form, comprises the following, by approximate weight %:

| | |
|---|---|
| C | 0.12-0.7 |
| Cr | 20-30 |
| Mo | 10-15 |
| Ni | 1-4 |
| Si | up to about 1 |
| Mn | up to about 1 |
| Fe | up to about 1 |
| W | up to about 1 |
| B + Cu | up to about 3 |
| Co | Balance |

Figure 1:
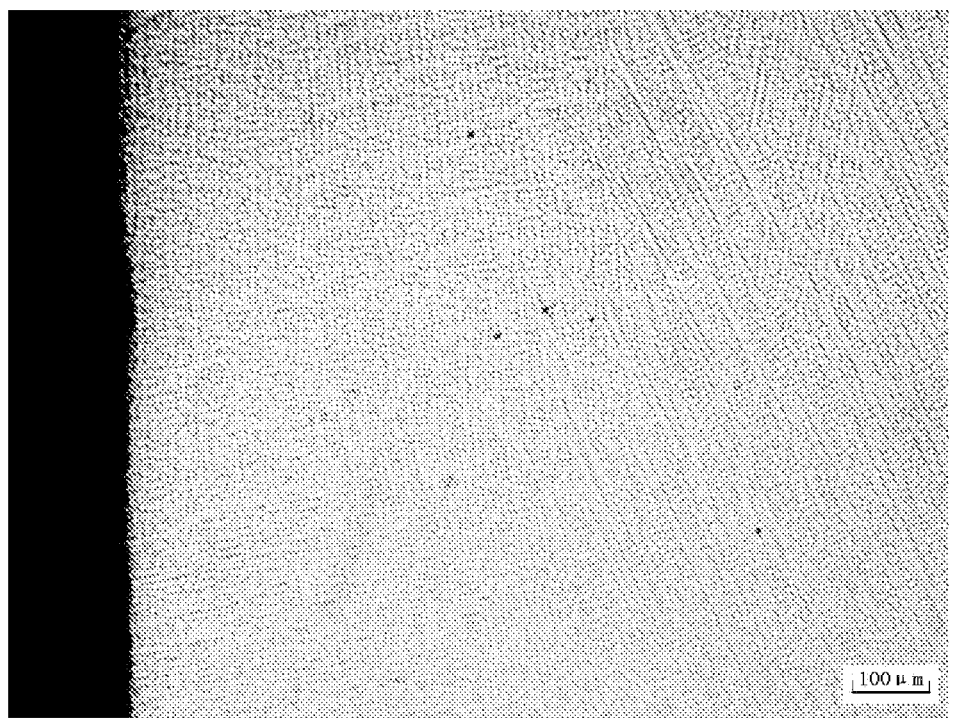
FIG. 1 is photomicrograph of the microstructure of an alloy of this invention.

The microstructure of an overlay using the alloy of this invention is shown in FIG. 1. The alloy's microstructure is hypoeutectic, having Co—Cr phase particles as the major constituent. These particles are the first to solidify as the alloy cools, doing so as dendrites to form a Cr-rich region. Further, secondary carbides also begin to form as the alloy cools. These carbides are mostly the Cr-rich $M_{23}C_6$ and Mo-rich $M_6C$ eutectic carbides. As the alloy continues to cool, a eutectic structure forms in between the dendrites and carbides in a lamellar fashion, and which is a Mo-rich region. The carbides are very finely dispersed in the alloy's eutectic regions. Little or no primary carbides (e.g., $M_7C_3$), which appear when the concentration of C is high (i.e., between about 0.8-3.5 wt %), are present in the alloy because of the carefully controlled C concentration. These primary carbides have higher C concentrations, are bulky and angular in shape, and typically increase an alloy's brittleness while reducing the alloy's corrosion resistance. In one embodiment, at least about 80% of the carbides in the alloy are secondary carbides. For example, at least about 90% of the carbides in the alloy are secondary carbides. In one preferred embodiment, substantially all of the carbides formed in the alloy are secondary carbides.

According to this invention, C is employed in the alloy to improve the final alloy's wear resistance. This is accomplished by reacting with other alloying elements to form hard carbides, such as Cr or Mo carbides. The concentration of C is closely controlled because excessive amounts can cause brittleness and diminish the efficacy of Cr or Mo. In one embodiment, the concentration of C in the alloy is between about 0.12 wt % and about 0.7 wt %. For example, one embodiment has a C concentration between about 0.2 wt % and about 0.4 wt %. In one preferred embodiment, the C concentration is about 0.3 wt %.

Chromium is provided in the alloy of the invention to enhance the corrosion resistance and to form hard carbides to improve wear resistance. High Cr concentrations can cause the molten alloy to be sluggish or have poor flow properties, while also causing the final alloy to be brittle. In one embodiment, the concentration of Cr in the alloy is between about 20 wt % and about 30 wt %. For example, the concentration of Cr is between about 25 wt % and about 30 wt %. In one such embodiment, the concentration of Cr is between about 27 wt % and about 29 wt %. In one preferred embodiment, the concentration of Cr is about 28 wt %.

Molybdenum is employed in the alloy to enhance abrasion resistance by forming hard carbides. Also, Mo is employed to improve the alloy's corrosion resistance, especially in pitting environments, e.g., seawater. Though prior art alloys rely heavily on W to improve wear resistance, Mo atoms are much smaller than W atoms, and with an atomic weight roughly half the atomic weight of W, there are roughly twice as many Mo atoms for a given weight percentage. Molybdenum has a greater affinity for C than does W, and diffuses much more quickly due to its smaller size, thereby favoring the formation of carbides to impart abrasion resistance. Furthermore, Mo imparts greater corrosion resistance than does W in acidic environments of a reducing nature. While the corrosion resistance imparted by Mo is believed to be imparted by Mo in solid solution, the wear resistance is imparted primarily by the formation of Mo carbides. However, high Mo concentrations will lower the alloy's ductility, thereby reducing the alloy's utility as a weld overlay on substrates that have not been preheated. Also, high Mo concentrations lower the fluidity of the molten alloy. In one embodiment, the concentration of Mo in the alloy is between about 10 wt % and about 15 wt %. For example, the concentration of Mo is between about 11 wt % and about 14 wt %. In one such embodiment, the concentration of Mo is between about 11 wt % and about 13 wt %. In one preferred embodiment, the concentration of Mo is about 12 wt %.

Nickel is included in the alloy to stabilize the ductile face-centered cubic phase of the Co-based alloy during cooling. In doing so, the alloy transforms to the harder hexagonal close-packed phase. The amount of Ni is limited because high Ni concentration can reduce the alloy's wear resistance. In one embodiment, the concentration of Ni in the alloy is between about 1 wt % and about 4 wt %. For example, the concentration of Ni is between about 1.2 wt % and about 3.5 wt %. In one such embodiment, the concentration of Ni is between about 1.2 wt % and about 3 wt %. In one preferred embodiment, the concentration of Ni is about 1.5 wt %.

Iron is a tolerated tramp element at a closely controlled concentration. An excessive amount of Fe has a detrimental effect on both the alloy's corrosion and wear resistance. Therefore, the concentration of Fe is no more than about 1 wt %. In one preferred embodiment, the concentration of Fe is no more than about 0.2 wt %.

Silicon may be incorporated in the alloy to facilitate melting and act as a deoxidizer. The concentration of Si should be high enough such that these advantageous affects can be realized in the alloy, but low enough such that brittle silicides do not form. For instance, if the Si concentration is too high, Si may combine with Mo to form brittle molybdenum silicides. In one embodiment, the Si concentration in the alloy is no more than about 1 wt %. In one preferred embodiment, the Si concentration is no more than about 0.7 wt %.

Other elements such as B and Cu can be present as incidental impurities or as intentional additions. Boron can be incorporated in the alloy to lower the alloy's melting temperature, thereby facilitating complete melting of the alloy and increasing the fluidity or flow characteristics of the molten alloy. Boron also promotes fusion of the alloy powder in spray-and-fuse methods. Copper can be included in the alloy to promote resistance to corrosion from micro-organisms in the alloy's environment, such as when the alloy is exposed to seawater. In particular, up to about 3 wt %, preferably up to about 1.5 wt %, of these elements cumulatively are included in the alloy.

In one preferred embodiment, the alloy's composition is controlled such that the electron vacancy number, $N_v$, as calculated by SAE Specification AS5491 (Revision B) is carefully controlled to a value less than about 2.80, preferably less than about 2.75, more preferably between about 2.32 and about 2.75. This specification AS5491 is incorporated by reference in its entirety, and is available for ordering from www.sae.org. An alloy's $N_v$ is defined as the average number of electron vacancies per 100 atoms of the alloy, and is closely related to the type of phases that will develop in the alloy and the sequence in which they form. It is calculable by the following equation:

$$N_v = \Sigma m_i (N_v)_i$$

Where $N_v$ is the electron vacancy number for the alloy, $m_i$ is the atomic mass fraction of the "i"th element in the alloy, and $(N_v)_i$ is the electron vacancy number for the "i"th element.

By controlling the alloy's $N_v$ in accordance with this particular preferred embodiment of the invention, applicants have discovered that the formation of brittle phases is restrained and, therefore, the alloy's propensity for brittle fracture or failure is reduced. For example, in one application, the alloy's $N_v$ is below about 2.75. In general, an approach to controlling the $N_v$ in accord with this invention is to reduce the concentration of Si while increasing the concentration of Ni and C. Also, while less Cr and Mo would decrease the alloy's $N_v$ further, the minimum concentrations recited herein are necessary for the alloy's desirable properties. Accordingly, the alloy's $N_v$ will generally be greater than about 2.25, such as greater than about 2.32. Therefore, in one embodiment, the alloy's $N_v$ is between about 2.25 and about 2.80, such as between about 2.32 and about 2.75 or between about 2.40 and about 2.60.

In an alternative preferred embodiment within the scope of the above broader disclosure, and which achieves the desired electron vacancy number, the alloy of the invention has different preferred ranges for C, Cr, Mo, Fe, and Si. In particular, in this alternative embodiment, the C has a concentration between about 0.45 wt % and about 0.65 wt %, more preferably between about 0.50 wt % and about 0.60 wt %, for example, about 0.54 wt %. In this alternative embodiment, the concentration of Cr is between about 21 wt % and about 27 wt %, more preferably between about 23 wt % and about 25 wt %, for example, about 24.2 wt %. The concentration of Mo in this alternative preferred embodiment is about 12 wt %. In this alternative embodiment, the concentration of Ni is between about 2 wt % and about 4 wt %, more preferably between about 2.7 wt % and about 3.7 wt %, for example, about 3.2 wt %. The tolerance for Fe in this embodiment is up to about 0.8%, and the Si concentration is no more than about 0.25 wt %.

In accordance with the invention, the alloy is prepared in a form suitable for surface-treatment applications. For example, the alloy can be prepared in powder form, as rods, as castings, as consumable electrodes, or as solid or tubular wires.

In one embodiment, in order to overlay the foregoing alloy composition as an overlay on a substrate, the inventors have developed a mechanism of a Co-based sheath with alloying constituents in the form of metal powder or particulates therein. In one such embodiment, the Co-based sheath is at least about 95 wt % Co, with the remainder comprising Fe and Ni. Other alloying elements, such as C, Cr, Mo, Ni, and perhaps additional Co, are in powder form held within the sheath. The powder alloying elements are present in a proportion such that, when coalesced with the Co-based sheath during the overlay operation, an overall alloy composition as described above is attained. In one embodiment, a wire fabricating machine is used to form the sheath and powder into a tubular wire. Here, the alloy powder mixture is fed onto the flat Co-based sheath as a narrow strip. The sheath is then formed into a tubular wire with the powder therein. The tubular wire is further formed by at least one additional rolling or drawing operation. These subsequent forming operations reduce the outer diameter of the tubular wire and compact the powder therein.

The Co-based sheath is engineered to have a wall thickness and diameter such that it is readily formable and provides an interior volume of the correct size to hold a volume of powder which, when all are coalesced, yields the desired final alloy composition. The specific powder composition is calculated for a particular sheath as a function of the sheath's wall thickness. For sheaths with thicker walls, an additional amount of non-Co alloying elements are included in the powder to avoid a coalesced alloy composition that has excess Co content. For sheaths with thinner walls, either (1) a lower amount of non-Co alloying elements or (2) additional Co in the form of powder or particles is included in the powder to avoid a coalesced alloy composition that is Co-deficient. In one embodiment, the outer diameter of the wire is between about 0.9 mm and about 4 mm. In another embodiment, possibly in conjunction with the previous embodiment, the sheath's wall has a thickness between about 0.15 mm and about 0.5 mm.

In one aspect of this invention, the alloy may be used in an overlay process. Here, any welding or similar technique suitable for use in an overlay application can be used. For example, plasma transferred arc welding (PTA), gas tungsten arc welding, gas metal arc welding, laser cladding, and spray-and-fuse methods can be used to apply the alloy as an overlay. In any of the above techniques, localized heat is generated near the surface of the substrate to be treated, having been optionally preheated. The Co-based alloy is then brought near the heat source to sufficiently melt the alloy, forming a weld pool on the substrate comprising the molten Co-based alloy and some molten substrate material. As the weld pool solidifies, a Co-based alloy overlay is formed, which is substantially free of thermal stress-induced fractures.

Another general method of applying a coating is by a spray-and-fuse coating method, which involves first melting the Co-based alloy, spraying the molten alloy onto a substrate, then fusing the sprayed alloy coating with a heat source. Typical heat sources include, e.g., induction heating, a laser, an infrared heat source, and a non-transferred plasma arc. Alternatively, the whole work piece could be placed in a furnace to achieve fusion of the coating.

In one preferred embodiment, PTA welding is employed to form the overlay. Here, heat is generated by an arc formed between the substrate and a nonconsumable tungsten electrode. This heat produces coalescence of the Co-based alloy and between the Co-based alloy and the substrate. A nozzle is in place around the arc, increasing the arc temperature and further concentrating the heat pattern compared to other techniques. A gas is used for shielding the molten weld metal. Using tungsten electrodes is preferred because of tungsten's high melting temperature and because it is a strong emitter of electrons.

Advantageously, the substrate does not have to be preheated in accord with the invention to achieve a coating or overlay that is substantially free of thermal stress-induced fractures, regardless of the specific technique employed.

EXAMPLES

The following non-limiting examples are provided to further illustrate the present invention.

Example 1

Forming a Weld Overlay on a Solid Rod

Figure 2:
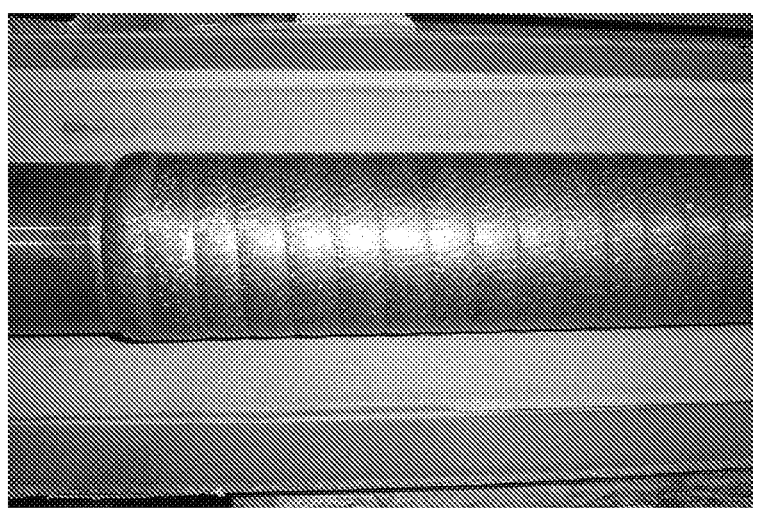
FIG. 2 is a photograph of a rod with an alloy overlay thereon.
Figure 3:
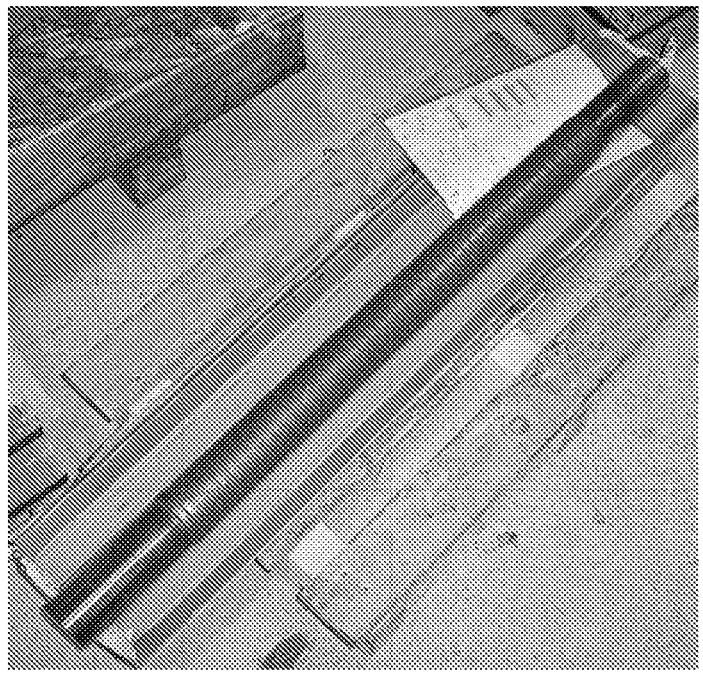
FIG. 3 is a photograph of a rod with an alloy overlay thereon.

A powder comprising about 0.3 wt % C, 28 wt % Cr, 12 wt % Mo, 1.5 wt % Ni, 0/2 wt % Fe, and the balance Co was prepared using standard powder metallurgy techniques. The powder was then applied to a solid rod via PTA welding. The rod had a diameter of about 60 mm and a length of about 700 mm. FIGS. 2 and 3 show the rod with the alloy overlay thereon.

Figure 4:
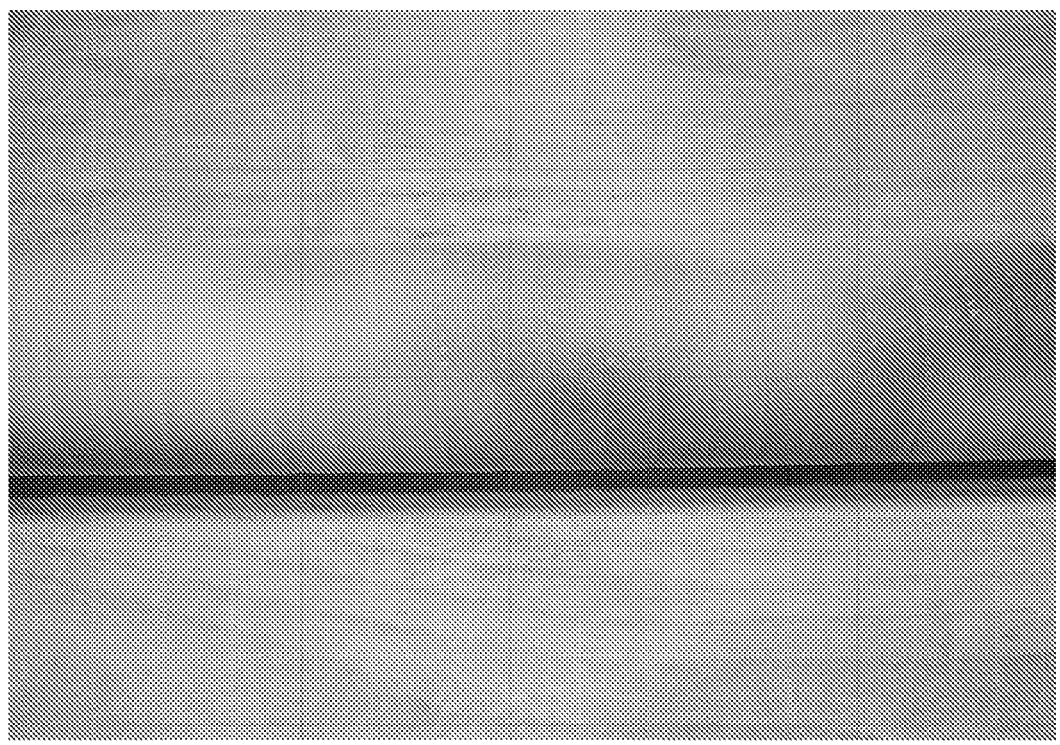
FIG. 4 is a photograph of a rod with an alloy overlay thereon after testing in accordance with ASTM E dye penetrant test.

The alloy overlay's hardness was subjected to a standard Vicker's hardness test and found to be 440 HV. Further, no cracks in the overlay were observed using a standard dye penetrant test specified in ASTM E165-02, "Standard Test Method for Liquid Penetrant Examination." A photograph of the overlay surface is shown in FIG. 4.

Example 2

Comparison of Physical and Chemical Properties

Three samples were formed using conventional casting techniques and tested to compare the physical and chemical properties of the alloy of this invention with other known alloys. Their compositions are given in the table below, with Sample A from Example 1 being the alloy of this invention, Sample B being an existing commercial alloy sold under the name Stellite 21, and Sample C being an existing commercial alloy sold under the name Ultimet.

|          | Cr | Mo  | C    | Si  | Ni  | W   | Fe  |
|----------|----|-----|------|-----|-----|-----|-----|
| Sample A | 28 | 12  | 0.3  | 0.5 | 1.5 | —   | 0.2 |
| Sample B | 28 | 5.5 | 0.3  | 1.5 | 3.0 | —   | 0.5 |
| Sample C | 26 | 5.5 | 0.06 | 1.0 | 9.0 | 2.0 | 3.0 |

To compare the corrosion resistance between Samples A and B, cast specimens were tested at room temperature for 72 hours under ASTM G31 corrosion testing method. This test showed no measurable loss of mass for Sample A, whereas Sample B suffered loss at a rate of 0.89 mm per year.

Figure 5:
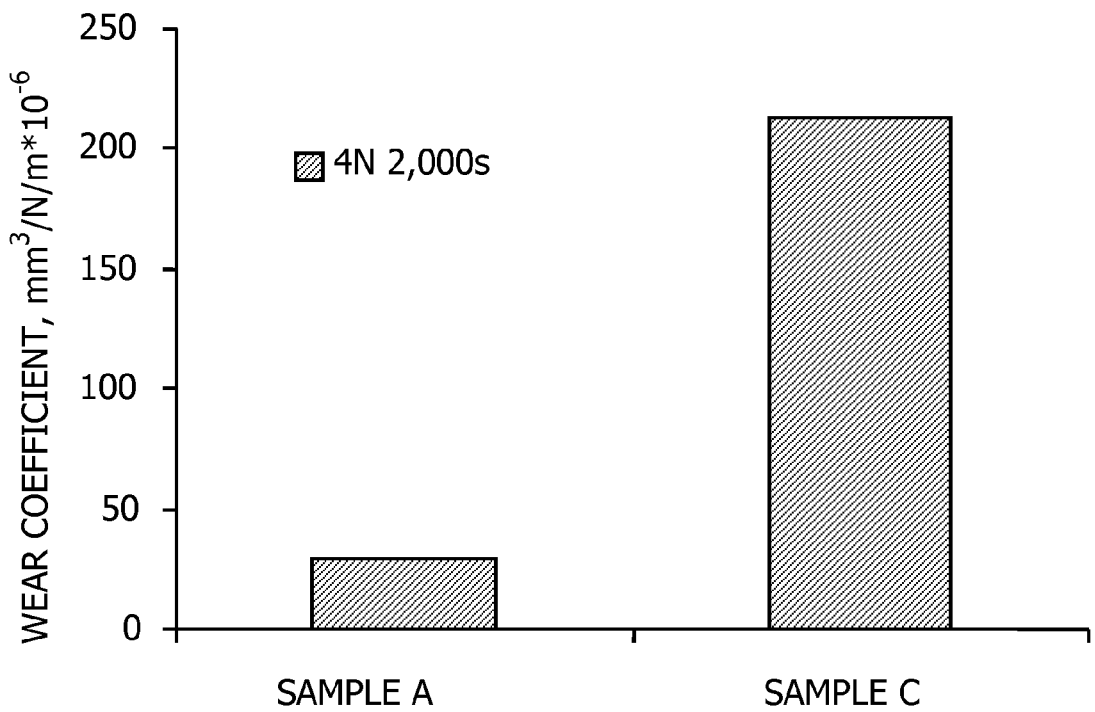
FIG. 5 is a table comparing the wear coefficient of the invention's alloy with a commercial alloy.
Figure 6:
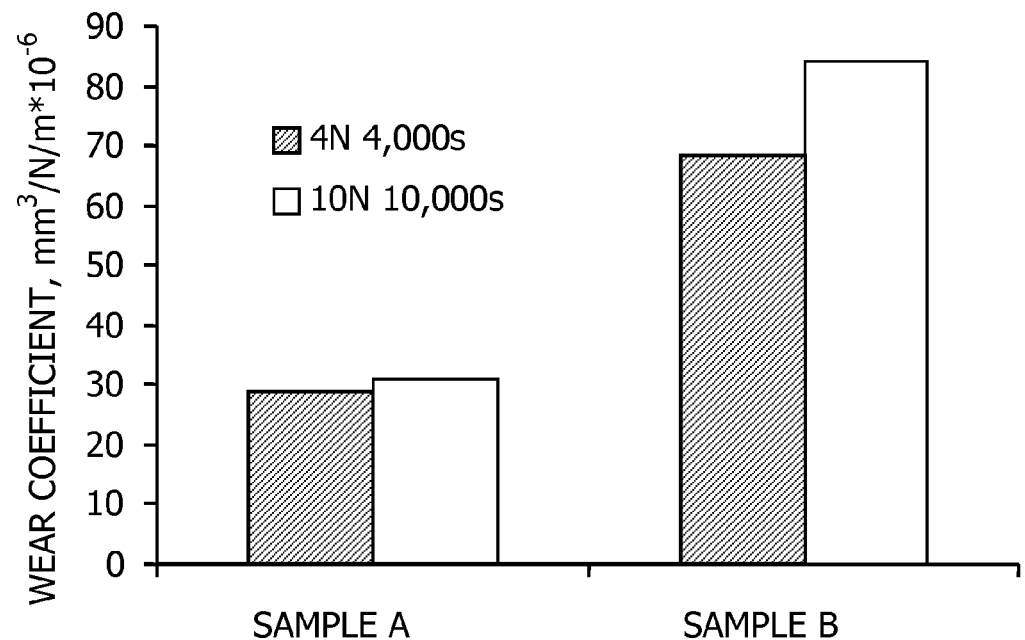
FIG. 6 is a table comparing the wear coefficient of the invention's alloy with a commercial alloy.

To compare the wear resistance between the three samples, a sliding wear test was conducted on a pin-on-disc tribometer for each Sample. Under this test, a ball made of 94% WC and 6% Co, with the hardness of HV 1534, was pressed against the specimen surface while it was spinning at a rotational speed of 319 RPM, resulting in a wear track or pit. Samples A and B were tested for 10,000 seconds under 10 N and for 4,000 seconds under 4 N using a ball with a 5 mm diameter. Samples A and C were tested for 2,000 seconds under 4 N using a ball with a diameter of 6 mm. The cross-section profiles of the wear track left in each sample were recorded. Based on these profiles, the wear volume loss was evaluated. The results are shown in FIGS. 5 and 6, which show that Sample A has higher sliding wear resistance than either Sample B or C.

Example 3

Microstructure

Figure 7:
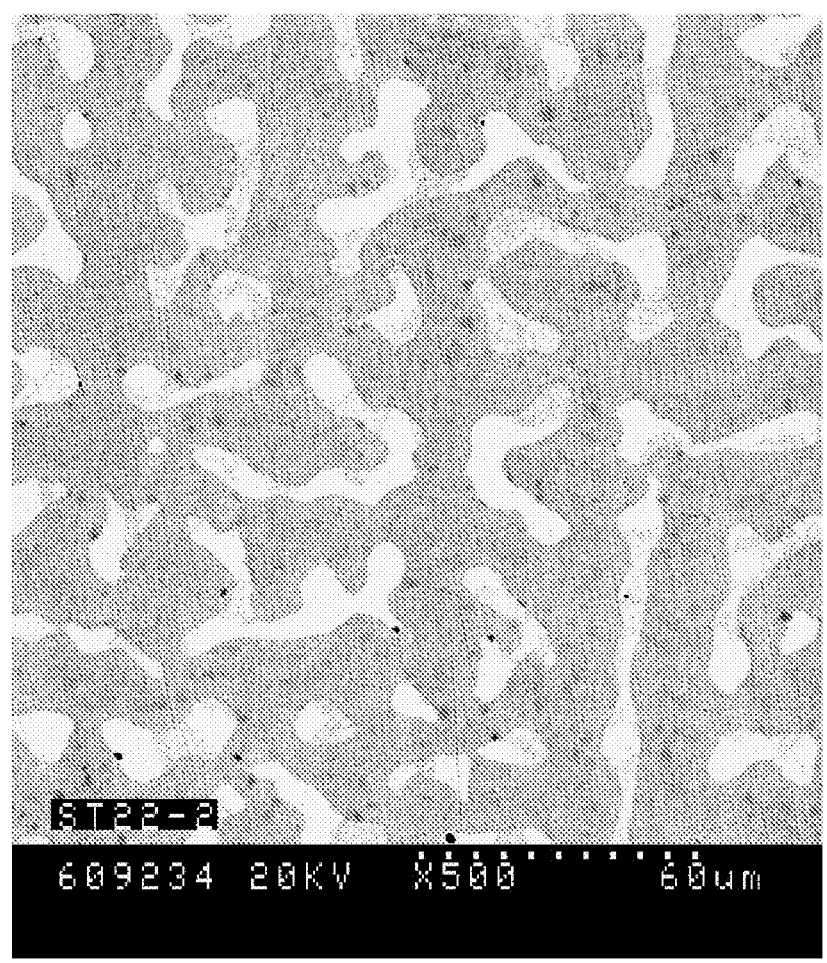
FIG. 7 is a photomicrograph of the microstructure of an alloy of this invention when cast.

The microstructure of a cast specimen of the invention's alloy having the composition of Sample A from Example 2 was examined. A back scattered electron image of the alloy is shown in FIG. 7. Analysis revealed a microstructure consisting of solid solution dendrites (dark areas) and eutectic regions (light areas) without primary carbide particles. The light eutectic regions indicate that they are rich in heavy elements, e.g., molybdenum. Since the specimen was cast, the microstructure is the result of slow cooling. With PTA welding, the overlay is usually cooled at a faster rate, creating a finer microstructure, e.g., FIG. 1.

Example 4

Effect of $N_v$

To demonstrate the impact of formulating the alloy such that the alloy's $N_v$ is within the preferred ranges of about 2.25 to about 2.80, such as between about 2.32 and about 2.75, two alloys were formed using conventional investment casing methods. Their compositions were as follows, with both samples' compositions falling within the elemental ranges recited above and having Co as the balance.

|             | Cr   | Mo   | C    | Si   | Ni  | Fe   |
|-------------|------|------|------|------|-----|------|
| Sample 22   | 28.5 | 12.4 | 0.26 | 1.13 | 1.5 | 0.25 |
| Sample 22C  | 24.2 | 12.2 | 0.54 | 0.15 | 3.2 | 0.73 |

Their electron vacancy numbers were calculated in accordance with SAE AS5491:

| | | | | | | | |
|---|---|---|---|---|---|---|---|
| | | | Sample 22 | | | | |
| Element | Wt % | Atomic Wt | Wt %/At. Wt | Atomic Fraction | Precip Adj | Matrix Atomic Fraction | Nv | Nv Product |
| Cr | 28.5 | 52 | 0.5481 | 0.3218 | 0.2899 | 0.3073 | 4.66 | 1.432 |
| Ti | | 47.9 | 0.0000 | 0.0000 | 0.0000 | 0.0000 | 6.66 | 0.000 |
| Mo | 12.4 | 95.94 | 0.1292 | 0.0759 | 0.0738 | 0.0782 | 4.66 | 0.364 |

-continued

Sample 22

| Element | Wt % | Atomic Wt | Wt %/At. Wt | Atomic Fraction | Precip Adj | Matrix Atomic Fraction | Nv | Nv Product |
|---|---|---|---|---|---|---|---|---|
| Al |  | 26.98 | 0.0000 | 0.0000 | 0.0000 | 0.0000 | 7.66 | 0.000 |
| Co | 55.96 | 58.93 | 0.9496 | 0.5575 | 0.5575 | 0.5910 | 1.71 | 1.011 |
| B |  | 10.81 | 0.0000 | 0.0000 | 0.0000 | 0.0000 | 7.66 | 0.000 |
| Zr |  | 91.22 | 0.0000 | 0.0000 | 0.0000 | 0.0000 | 6.66 | 0.000 |
| C | 0.26 | 12.01 | 0.0216 | 0.0127 | 0.0000 | 0.0000 | 0 | 0.000 |
| Si | 0.25 | 28.09 | 0.0089 | 0.0052 | 0.0052 | 0.0055 | 6.66 | 0.037 |
| Mn |  | 54.94 | 0.0000 | 0.0000 | 0.0000 | 0.0000 | 3.66 | 0.000 |
| Fe | 1.13 | 55.85 | 0.0202 | 0.0119 | 0.0119 | 0.0126 | 2.66 | 0.033 |
| Cu |  | 63.54 | 0.0000 | 0.0000 | 0.0000 | 0.0000 | 0 | 0.000 |
| V |  | 50.94 | 0.0000 | 0.0000 | 0.0000 | 0.0000 | 5.66 | 0.000 |
| W |  | 183.85 | 0.0000 | 0.0000 | 0.0000 | 0.0000 | 4.66 | 0.000 |
| Ta |  | 180.95 | 0.0000 | 0.0000 | 0.0000 | 0.0000 | 5.66 | 0.000 |
| Cb |  | 92.91 | 0.0000 | 0.0000 | 0.0000 | 0.0000 | 5.66 | 0.000 |
| Hf |  | 178.49 | 0.0000 | 0.0000 | 0.0000 | 0.0000 | 6.66 | 0.000 |
| Re |  | 186.21 | 0.0000 | 0.0000 | 0.0000 | 0.0000 | 4.66 | 0.000 |
| Ni | 1.5 | 58.71 | 0.0255 | 0.0150 | 0.0051 | 0.0054 | 0.61 | 0.003 |
| Sum | 100 |  | 1.7033 | 1.0000 | 0.9434 |  |  | 2.88 |

Sample 22C

| Element | Wt % | Atomic Wt | Wt %/At. Wt | Atomic Fraction | Precip Adj | Matrix Atomic Fraction | Nv | Nv Product |
|---|---|---|---|---|---|---|---|---|
| Cr | 24.2 | 52 | 0.4654 | 0.2720 | 0.2178 | 0.2342 | 4.66 | 1.091 |
| Ti |  | 47.9 | 0.0000 | 0.0000 | 0.0000 | 0.0000 | 6.66 | 0.000 |
| Mo | 12.2 | 95.94 | 0.1272 | 0.0743 | 0.0699 | 0.0752 | 4.66 | 0.350 |
| Al |  | 26.98 | 0.0000 | 0.0000 | 0.0000 | 0.0000 | 7.66 | 0.000 |
| Co | 58.98 | 58.93 | 1.0008 | 0.5849 | 0.5849 | 0.6288 | 1.71 | 1.075 |
| B |  | 10.81 | 0.0000 | 0.0000 | 0.0000 | 0.0000 | 7.66 | 0.000 |
| Zr |  | 91.22 | 0.0000 | 0.0000 | 0.0000 | 0.0000 | 6.66 | 0.000 |
| C | 0.54 | 12.01 | 0.0450 | 0.0263 | 0.0000 | 0.0000 | 0 | 0.000 |
| Si | 0.15 | 28.09 | 0.0053 | 0.0031 | 0.0031 | 0.0034 | 6.66 | 0.022 |
| Mn |  | 54.94 | 0.0000 | 0.0000 | 0.0000 | 0.0000 | 3.66 | 0.000 |
| Fe | 0.73 | 55.85 | 0.0131 | 0.0076 | 0.0076 | 0.0082 | 2.66 | 0.022 |
| Cu |  | 63.54 | 0.0000 | 0.0000 | 0.0000 | 0.0000 | 0 | 0.000 |
| V |  | 50.94 | 0.0000 | 0.0000 | 0.0000 | 0.0000 | 5.66 | 0.000 |
| W |  | 183.85 | 0.0000 | 0.0000 | 0.0000 | 0.0000 | 4.66 | 0.000 |
| Ta |  | 180.95 | 0.0000 | 0.0000 | 0.0000 | 0.0000 | 5.66 | 0.000 |
| Cb |  | 92.91 | 0.0000 | 0.0000 | 0.0000 | 0.0000 | 5.66 | 0.000 |
| Hf |  | 178.49 | 0.0000 | 0.0000 | 0.0000 | 0.0000 | 6.66 | 0.000 |
| Re |  | 186.21 | 0.0000 | 0.0000 | 0.0000 | 0.0000 | 4.66 | 0.000 |
| Ni | 3.2 | 58.71 | 0.0545 | 0.0319 | 0.0468 | 0.0503 | 0.61 | 0.031 |
| Sum | 100 |  | 1.7113 | 1.0000 | 0.9301 |  |  | 2.59 |

Sample 22 had an electron vacancy number of 2.88, which is outside the preferred range, whereas Sample 22C had an electron vacancy number of 2.59, which is in the preferred range.

To compare the ductility of the samples, an impact test conducted at room temperature was performed according to ASTM E23-06. The samples were 0.5"×0.5"×2.5" in a simple beam (Charpy) configuration. The results showed a marked increase in impact energy dissipated by the samples, with Sample 22 recording 9 ft-lb and Sample 22C recording 22 ft-lb.

Figure 8:
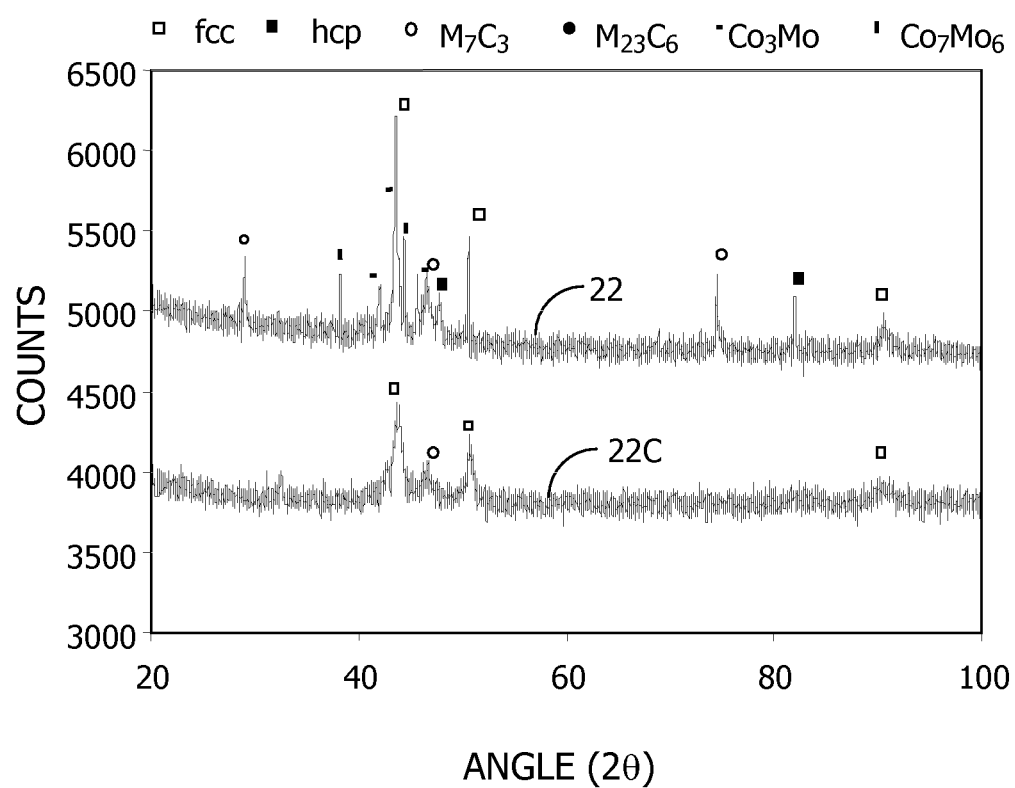
FIG. 8 is a graph showing the results of the X-ray analysis performed in Example 4.

Further analysis of the samples using X-ray diffraction showed that Sample 22C consists essentially of two phases: a face-centered cubic (fcc) phase and a primary carbide phase of $M_7C_3$. In contrast, Sample 22 comprises a plurality of phases including, e.g., the fcc and the primary carbide phases, as well as a hexagonal-close-packed phase, a secondary carbide phase ($M_{23}C_6$), an first intermetallic phase ($Co_3Mo$), and a second intermetallic phase ($Co_7Mo_6$). Without being bound to a particular theory, it is believed that Sample 22C's improved ductility is due in large part to the reduced number of phases in the Sample 22C's microstructure. The X-ray diffraction analysis results are shows in FIG. 8.

When introducing elements of the present invention or the preferred embodiment(s) thereof, the articles "a," "an," "the," and "said" are intended to mean that there are one or more of the elements. The terms "comprising, " "including," and "having" are intended to be inclusive and mean that there may be additional elements other than the listed elements.

In view of the above, it will be seen that the several objects of the invention are achieved and other advantageous results attained.

As various changes could be made in the above methods and products without departing from the scope of the invention, it is intended that all matter contained in the above description and shown in the accompanying drawings shall be interpreted as illustrative and not in a limiting sense.

What is claimed is:

1. A method for forming a wear- and corrosion- resistant overlay on a metal substrate comprising:
applying molten material comprising metal constituents of a Co-Cr-Mo alloy comprising between about 0.12 wt% and about 0.7 wt% C, between about 20 wt% and about 30 wt% Cr, between about 10 wt% and about 15 wt% Mo, between about 1 wt% and about 4 wt% Ni, and between about 50.30 wt% and about 68.88 wt% of Co; and
solidifying the molten material on the substrate to form said overlay comprising said Co-Cr-Mo alloy . wherein the alloy has a hypoeutectic microstructure.

2. The method of claim 1 wherein the Co-Cr-Mo alloy has an electron vacancy number between about 2.25 and about 2.80 as calculated using SAE specification AS5491 (Revision B).

3. The method of claim 2 wherein the applying the molten material is according to a technique selected from the group of techniques consisting of plasma transferred arc welding, gas tungsten arc welding, gas metal arc welding, laser cladding, and spray-and-fuse methods.

4. The method of claim 2 wherein the applying molten material is accomplished by plasma transferred arc welding.

5. The method of claim 2 wherein the overlay has a thickness between about 50 microns and about 10 mm.

6. The method of claim 1 wherein the Co-Cr-Mo alloy has an electron vacancy number between about 2.32 and about 2.75 as calculated using SAE specification AS5491 (Revision B).

7. The method of claim 1 wherein the alloy comprises between about 0.45 wt% and about 0.65 wt% C, between about 21 wt% and about 27 wt% Cr, between about 2 wt% and about 4 wt% Ni, and less than about 0.25 wt% Si.

8. The method of claim 7 wherein the Co-Cr-Mo alloy has an electron vacancy number between about 2.25 and about 2.80 as calculated using SAE specification AS5491 (Revision B).

9. The method of claim 7 wherein the Co-Cr-Mo alloy has an electron vacancy number between about 2.32 and about 2.75 as calculated using SAE specification AS5491 (Revision B).

10. The method of claim 1 wherein the alloy comprises between about 0.50 wt% and about 0.60 wt% C, between about 23 wt% and about 25 wt% Cr, between about 2.7 wt% and about 3.7 wt% Ni, and less than about 0.25 wt% Si.

11. The method of claim 1 wherein the alloy comprises between about 0.20 wt% and about 0.40 wt% C, between about 25 wt% and about 30 wt% Cr, between about 11 wt% and about 14 wt% Mo. between about 1.2 wt% and about 3.5 wl% Ni, and less than about 0.7 wt% Si.

12. The method of claim 1 wherein the alloy consists essentially of between about 0.12 wt% and about 0.7 wl% C. between about 20 wt% and about 30 wt% Cr, between about 10 wt% and about 15 wt% Mo, between about 1 wt% and about 4 wt% Ni, less than about 0.25 wt% Si, less than about 1 wt% Fe, and balance of Co; and
wherein the Co-Cr-Mo alloy has an electron vacancy number between about 2.25 and about 2.80 as calculated using SAE specification AS5491 (Revision B).

13. The method of claim 12 wherein the alloy consists essentially of
Cr—24.2 wt %
Mo—12.2 wt %
C—0.54 wt %
Ni—3.2 wt %
Si—<0.25 wt %
Fe—<0.73 wt %
Co—Balance.

14. The method of claim 13 wherein the Co-Cr-Mo alloy has an electron vacancy number between about 2.32 and about 2.75 as calculated using SAE specification AS5491 (Revision B). and wherein the alloy has an alloy microstructure consisting essentially of a face-centered cubic Co- based phase and a M7C3 carbide phase.

15. The method of claim 1 wherein the applying molten material employs a heat source that is an electric arc.

16. The method of claim 1 wherein the applying the molten material is according lo a technique selected from the group of techniques consisting of plasma transferred arc welding, gas tungsten arc welding, gas metal arc welding, laser cladding, and spray-and-fuse methods.

17. The method of claim 1 wherein the applying molten material is accomplished by plasma transferred arc welding.

18. The method of claim 1 wherein ihe Ni content of the molten material is between 1 wt% and 4 wt%.

19. The method of claim 1 wherein the Ni content of the molten material is between 2.7 wt% and 3.7 wt%.

20. The method of claim 1 wherein the molten metal material consists essentially of said between about 0.12 wt% and about 0.7 wt% C. said between about 20 wt% and about 30 wt% Cr, said between about 10 wt% and about 15 wt% Mo, said between about 1 wt% and about 4 wt% Ni, and said between about 50.30 wt% and about 68.88 wt% of Co; and wherein a concentration of Fe is tolerated of no more than about 1 wt% and a Si concentration is no more than about 1 wt%.

21. The method of claim 1 wherein the molten metal material consists essentially of between 0.12 wt% and 0.7 wt% C, between 20 wt% and 30 wt% Cr, said between 10 wt% and 15 wt% Mo, said between 1 wt% and 4 wt% Ni, and between 50.30 wt% and 68.88 wt% of Co; and wherein a concentration of Fe is tolerated of no more than about 1 wt% and a Si concentration is no more than about 1 wt%.

22. The method of claim 1 wherein the C has a concentration between about 0.45 wt% and about 0.65 wt%, the concentration of Cr is between about 21 wt% and about 27 wt%, the concentration of Ni is between about 2 wt% and about 4 wt%, a tolerance for Fe is up to about 0.8%, and a Si concentration is no more than about 0.25 wt%.

23. The method of claim 1 wherein the C has a concentration between about 0.5 wt% and about 0.60 wt%, the concentration of Cr is between about 23 wt% and about 25 wt%, the concentration of Ni is between about 2.7 wt% and about 3.7 wl%, a tolerance for Fe is up to about 0.8%, and a Si concentration is no more than about 0.25 wt%.

24. The method of claim 1 wherein the alloy consists of, by approximate weight %:
C 0.12-0.7
Cr 20-30
MO 10-15
Ni 1-4
Si up to about 1
Mn up to about 1
Fe up to about 1
B+C up to about 3
Co Balance,
and wherein the Co-Cr-Mo alloy has an electron vacancy number between about 2.32 and about 2.75 as calculated using SAE specification AS5491 (Revision B).

25. The method of claim 24 wherein the alloy microstructure consists essentially of a face-centered cubic Co-based phase and a $M_7C_3$ primary carbide phase.

* * * * *